United States Patent
Iyer et al.

(10) Patent No.: US 12,482,215 B1
(45) Date of Patent: Nov. 25, 2025

(54) KNOWLEDGE RETRIEVAL TECHNIQUES

(71) Applicant: ExlService Holdings, Inc., New York, NY (US)

(72) Inventors: Gaurav Iyer, New Delhi (IN); Arturo Devesa, New York, NY (US); Solmaz Torabi, Austin, TX (US); Raunak Nitin Rathi, Pune (IN); Vignesh R, Chennai (IN); Khushi Aggarwal, Shamli (IN); Manjul Sindhu, New Delhi (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/272,982

(22) Filed: Jul. 17, 2025

(51) Int. Cl.
  *G06V 10/26* (2022.01)
  *G06F 40/295* (2020.01)
  *G06V 10/82* (2022.01)
  *G10L 15/16* (2006.01)
  *G10L 15/18* (2013.01)

(52) U.S. Cl.
  CPC ............ *G06V 10/26* (2022.01); *G06F 40/295* (2020.01); *G06V 10/82* (2022.01); *G10L 15/16* (2013.01); *G10L 15/1815* (2013.01)

(58) Field of Classification Search
  CPC ...... G06V 10/26; G06V 10/82; G06F 40/295; G10L 15/16; G10L 15/1815
  See application file for complete search history.

(56) References Cited

U.S. PATENT DOCUMENTS

| | | | |
|---|---|---|---|
| 2010/0021069 A1* | 1/2010 | Fan | G06T 7/136 382/224 |
| 2017/0111059 A1* | 4/2017 | Guilford | H03M 7/40 |
| 2018/0081861 A1* | 3/2018 | Danielyan | G06F 40/131 |
| 2021/0157975 A1* | 5/2021 | Gelosi | G06F 40/166 |
| 2023/0153641 A1* | 5/2023 | Manda | G06F 40/295 707/603 |
| 2024/0160953 A1* | 5/2024 | Manda | G06N 5/01 |
| 2024/0273291 A1* | 8/2024 | Smith | G06F 16/383 |
| 2025/0148210 A1* | 5/2025 | Vasilescu | G06F 16/338 |
| 2025/0165529 A1* | 5/2025 | Annamalai | G06N 20/00 |

* cited by examiner

*Primary Examiner* — Amara Abdi
(74) *Attorney, Agent, or Firm* — Perkins Coie LLP

(57) ABSTRACT

A resource processor segments a resource into content chunks based on dynamically identified boundaries and uses the content chunks to determine a first concept, a second concept, and a relationship, such as by performing concept proximity analysis and/or by analyzing resource metadata. A node generator generates and causes execution of computer-executable code to generate a node triple in a graph structure, the node triple including a first node encoding the first concept, a second node encoding the second concept, and a relationship node. A node indexer uses the node triple to generate embeddings, which are indexed relationally to a first node identifier that correlates to the first concept. An interface module queries the embeddings to identify embeddings associated with the first node identifier that correlates to at least a portion of a query. Updates to the resource cause incremental updates in portions of related nodes and related embeddings.

20 Claims, 11 Drawing Sheets

```
// Node JSON
{
  "name": "John Doe",
  "label": "Test Candidate",
  "relationship_type": "TESTED_ON",
  "relationship_target": "Resume Screening Pipeline",
  "description": "A candidate who applied for a software engineering position",
  "source": "JD Resume",
  "skills": ["Java", "Python", "Machine Learning"],
  "experience": 5,
  "embedding_id": "embedding:67890",
  "cypher_query": "CREATE (n:TestCandidate {name: 'John Doe'})",
  "version": 3,
  "update_history": [
    {
      "version": 1,
      "updated_at": "2022-01-01T12:00:00Z",
      "changes": {
        "skills": ["Java", "Python"]
      },
      "embedding_id": "embedding:67888"
    },
    {
      "version": 2,
      "updated_at": "2022-01-15T14:00:00Z",
      "changes": {
        "experience": 5
      },
      "embedding_id": "embedding:67889"
    },
    {
      "version": 3,
      "updated_at": "2022-02-01T10:00:00Z",
      "changes": {
        "skills": ["Java", "Python", "Machine Learning"]
      },
      "embedding_id": "embedding:67890"
    }
  ]
}
```

*FIG. 2C*

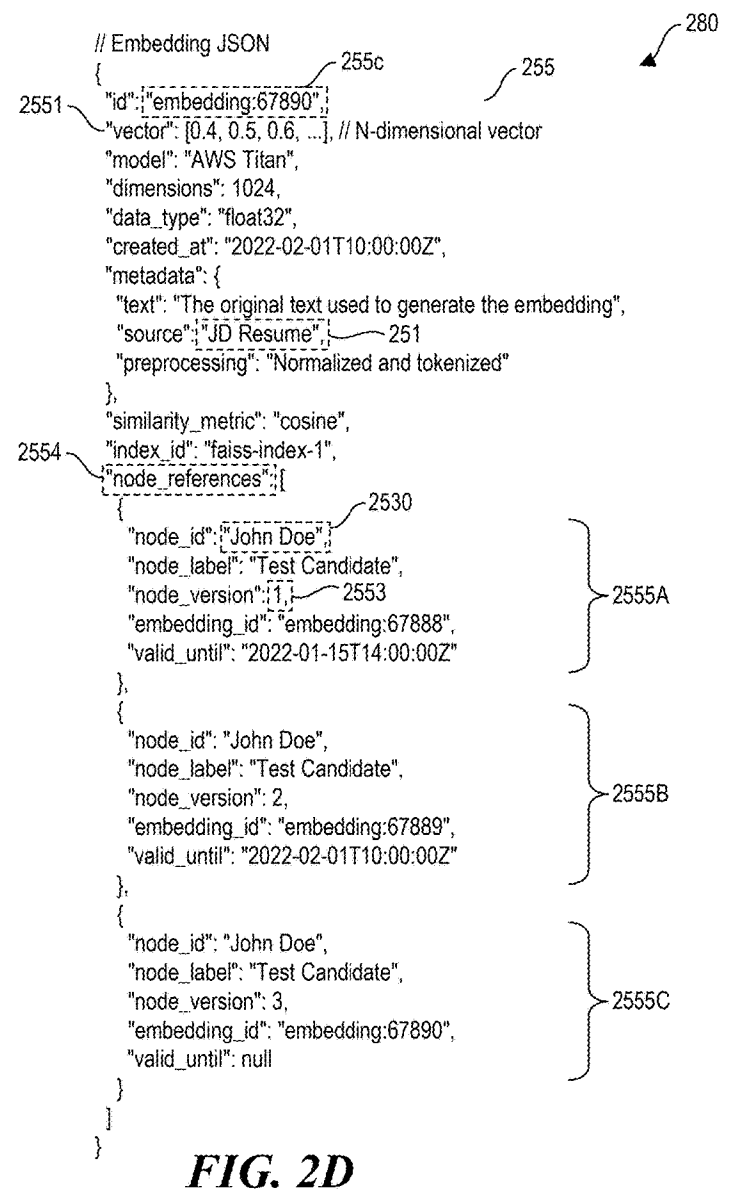

```
// Embedding JSON                                  ─ 255
{
    "id": "embedding:67890",                       ─ 255c
    "vector": [0.4, 0.5, 0.6, ...],  // N-dimensional vector
    "model": "AWS Titan",
    "dimensions": 1024,
    "data_type": "float32",
    "created_at": "2022-02-01T10:00:00Z",
    "metadata": {
        "text": "The original text used to generate the embedding",
        "source": "JD Resume"                      ─ 251
        "preprocessing": "Normalized and tokenized"
    },
    "similarity_metric": "cosine",
    "index_id": "faiss-index-1",
    "node_references": [                           ─ 2530
        {
            "node_id": "John Doe",                 ─ 2553
            "node_label": "Test Candidate",
            "node_version": 1,                     ⎫
            "embedding_id": "embedding:67888",     ⎬ 2555A
            "valid_until": "2022-01-15T14:00:00Z"  ⎭
        },
        {
            "node_id": "John Doe",
            "node_label": "Test Candidate",        ⎫
            "node_version": 2,                     ⎬ 2555B
            "embedding_id": "embedding:67889",     ⎭
            "valid_until": "2022-02-01T10:00:00Z"
        },
        {
            "node_id": "John Doe",
            "node_label": "Test Candidate",        ⎫
            "node_version": 3,                     ⎬ 2555C
            "embedding_id": "embedding:67890",     ⎭
            "valid_until": null
        }
    ]
}
```
↖ 280

*FIG. 2D*

KNOWLEDGE RETRIEVAL TECHNIQUES

BACKGROUND

In computer science, a document is a digital collection of data or information, typically stored in a file or database, encompassing various formats such as text, images (such as photos, diagrams, and charts), multimedia, and metadata, such as author and creation date. Documents can also include embedded documents, where one document is inserted within another, such as a spreadsheet embedded in a text document. For instance, a text document can contain an embedded presentation or an image file. Documents can take various forms, including text documents (such as .txt and .pdf), spreadsheets (such as .csv), web pages (HTML documents), and more. Documents can be manipulated, stored, and transmitted using software applications and protocols. Furthermore, documents can be searched using keyword searches, where specific words or phrases are used to find relevant documents. Additionally, documents can be semantically searched, where the meaning and context of document content are analyzed to retrieve relevant results, enabling more accurate and relevant search outcomes. This can be achieved through natural language processing (NLP) and machine learning techniques that understand the relationships between words and concepts.

NLP works by leveraging machine learning algorithms to analyze and understand human language, enabling semantic search capabilities. NLP models are trained on vast amounts of text data, allowing them to learn the nuances of language, including syntax, semantics, and context. When applied to document search, NLP models can identify concepts and relationships within documents, going beyond simple keyword matching. By capturing the meaning and intent behind the text, NLP enables more accurate and relevant search results.

BRIEF DESCRIPTION OF THE DRAWINGS

Detailed descriptions of implementations of the present invention will be described and explained through the use of the accompanying drawings.

FIG. 2C illustrates aspects of a node, such as a knowledge graph node, of a node repository, where the node can encode at least a portion of a node triple and can be generated by a node generator of the example semantic network platform, according to some implementations of the present technology.

FIG. 2D illustrates aspects of an embedding, such as a vector and/or relation representations in a vector space, generated by a node indexer of a vector repository of the example semantic network platform, according to some implementations of the present technology.

Figure 1:
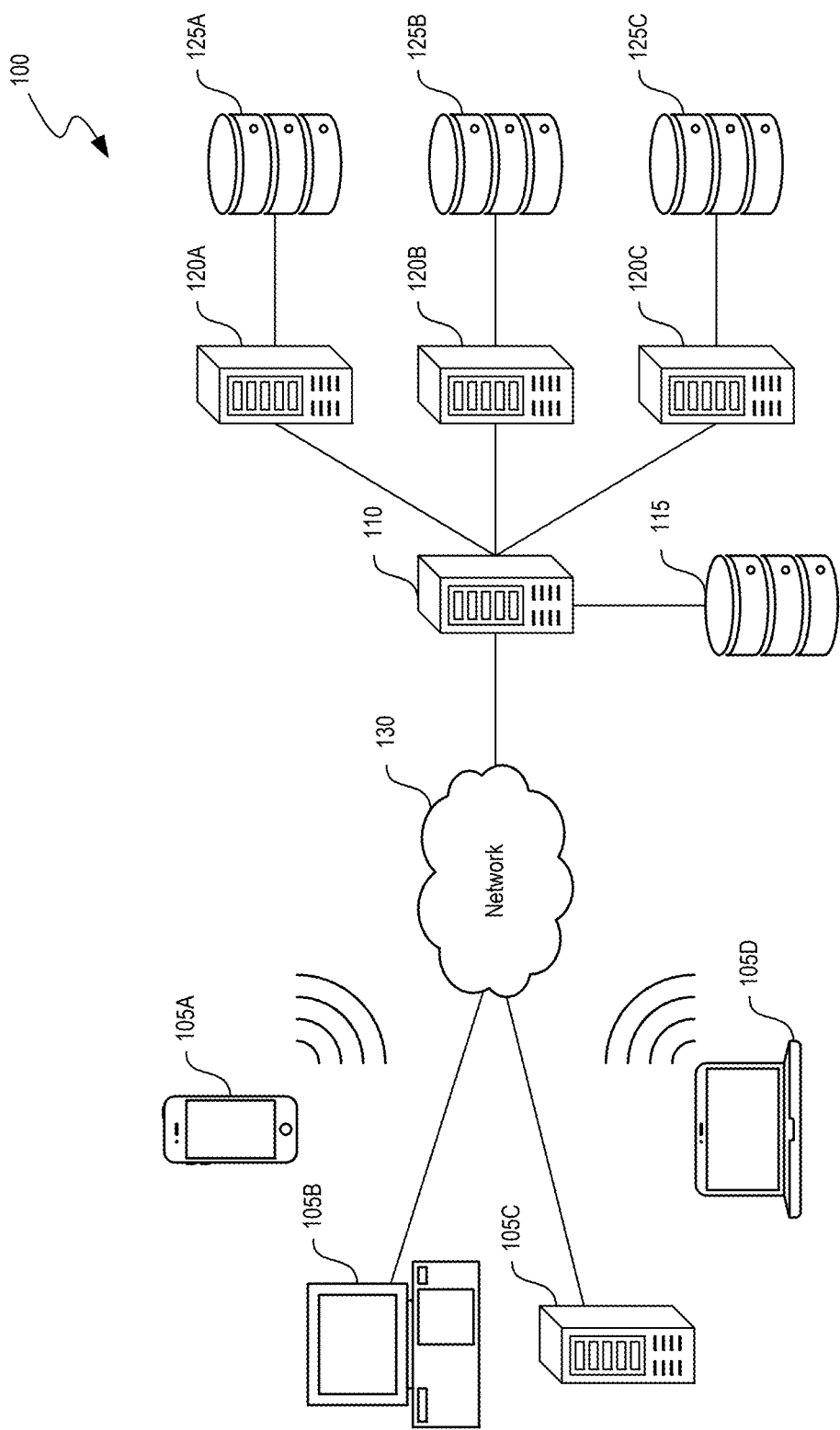
FIG. 1 is a system diagram illustrating an example of a computing environment in which the disclosed semantic network platform operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present disclosure describes a semantic network platform that implements improvements to conventional knowledge retrieval techniques. The disclosed platform and techniques optimize computational efficiency and resource utilization in computer-based knowledge retrieval operations, allowing for efficient and scalable applications of enhanced knowledge graphs. In some aspects, the disclosed platform and techniques enable efficient context window management for queries against sets of documents. For example, the disclosed techniques enable selection and processing of documents, or collections of related documents, to generate sets of concepts and, using the concepts and inferred concept relationships, generating sets of related nodes for inclusion in knowledge graphs. In some aspects, the disclosed techniques relate to scalable methods for incrementally updating knowledge graphs to reflect changes in source documents, such as via synchronization operations that relate concept (or other unit) changes in documents to node information (e.g., node collections, node identifiers, node properties) in a knowledge graph. In some aspects, the disclosed techniques enable integration into knowledge graphs of non-textual or multi-modal data like text, images, and computer code, such as by translating non-textual data into textual or alphanumeric representations. These innovations enable more accurate queries against documents, improved semantic search capabilities, and support for comparatively more complex questions, such as via queries that can efficiently cover multiple concepts and/or documents by searching corresponding knowledge graphs. These multi-hop operations can be prohibitively resource-intensive if performed directly on source documents.

One significant challenge in applying NLP techniques to search source documents directly is the context window problem, which makes it difficult for NLP models to accurately identify and correlate complex concepts to dynamically respond to queries. The context window problem involves two issues: selecting relevant information to include in the context window and managing the size of the resulting context window.

To illustrate the information selection and access problem, a professional resume may list various projects an applicant has worked on, but to accurately evaluate the applicant's skill set and technical contributions, it may be desirable to analyze projects in code repositories (e.g. GitHub), which can be linked or referenced in the applicant's resume. Programmatically identifying, accessing, and parsing the linked documents can result in increased latency due to the processing time needed to select additional relevant documents to include in the context window, retrieve these documents (e.g., by navigating to a URL or via web crawling), and optimize them for NLP (e.g., via translation). Multi-modal documents that combine text, images, computer code, and/or other media, as well as documents that reference external resources, such as linked files or code repositories, may need to be converted (translated) to natural-language form to make them suitable for processing via NLP, which further increases latency.

To illustrate the context window size problem, as linked documents are identified and processed on a real-time basis to respond to a query against the documents, the resulting context window can become too large to generate a quality response using NLP. For instance, if a resume references multiple code repositories, each containing thousands of lines of code, the resulting context window would need to include a vast amount of information, exceeding the token or memory window size of the NLP.

The aforementioned problems make it challenging for NLP models to accurately capture the relationships between elements and identify the underlying concepts across sets of documents. As a result, NLP models can struggle to provide relevant and accurate query responses.

Traditional approaches to addressing the context window problem include techniques such as passage retrieval, where relevant passages are extracted from larger documents to reduce the context window size. However, caching frequently accessed document sections can require substantial memory resources to store the cached information effectively. Other approaches include document chunking, where documents are divided into smaller segments for in-memory processing, and hierarchical or multi-resolution representations, which enable models to capture both local and global context. However, these approaches can be problematic when applied to process documents that have complex structures, such as nested or overlapping segments. Passage retrieval and undifferentiated chunking (e.g., chunking that does not take into account document content) may lead to a loss of contextual information, particularly if the segmentation approach does not align with the underlying structure of the source document. In-memory hierarchical concept mapping and processing of document sections can be prohibitively resource-intensive. As a result, NLP models may not always capture the most relevant information, and the loss of context can lead to inaccurate or incomplete understanding of the document.

One approach to addressing the context window problem is using knowledge graphs. Knowledge graphs are structured representations of knowledge that capture entities, relationships, and concepts within a domain. They provide a framework for normalizing unstructured data, thereby enabling more effective semantic search and reasoning. By organizing information (e.g., content from source documents) into a graph structure, knowledge graphs facilitate the identification of relationships between entities and concepts, allowing for more accurate and comprehensive search results. The benefits of knowledge graphs are multifaceted. They provide a unified view of distinct data sources, enable complex querying and reasoning, and support the integration of domain-specific knowledge.

Challenges associated with knowledge graphs include explainability and scalability challenges. One significant challenge lies in updating knowledge graphs to reflect changes in documents, which can be a time-consuming and labor-intensive process. Conventionally when importing updated versions of documents, a platform may regenerate the knowledge graph, which can be computationally expensive and can lead to lack of explainability because incremental version changes of the source document(s) can be lost. The scalability of knowledge graphs also poses a significant concern, as the size and complexity of documents escalate. As the volume of data increases, integrating changes in documents into existing knowledge graphs poses substantial challenges. The generation of knowledge graphs from scratch subsequently to updates can be computationally expensive, necessitating considerable resources and processing power, such as high-performance computing clusters, distributed storage systems, and caching mechanisms to optimize query performance.

In addition, conventional knowledge graphs encounter a further challenge because they do not natively accommodate with diverse data types. Traditionally, knowledge graphs are designed to store representations of alphanumeric data (e.g., in vectorized form), and may experience difficulties in generating computationally efficient representations of other data types, such as images and computer code, that are not inherently searchable via text.

The present disclosure addresses these and other limitations of existing systems and knowledge graphs. In an example implementation of the semantic network platform disclosed herein, a resource processor segments a resource (e.g., a document) into content chunks based on dynamically identified boundaries and uses the content chunks to determine a first concept, a second concept, and a relationship, such as by performing concept proximity analysis and/or by analyzing resource metadata. In some implementations, a translation pre-processing layer can generate textual or alphanumeric representations of non-textual data, such as images, videos, audio, and/or computer code. Translation pre-processing for these data types enables knowledge graphs to support a broad range of applications and data sources.

Using the resource, which can include the output of translation pre-processing operations, a node generator generates and causes computer-executable code to be executed to generate a node triple in a graph structure, the node triple including a first node encoding the first concept, a second node encoding the second concept, and a relationship node. A node indexer uses the node triple to generate embeddings, which are included in the nodes or are indexed relationally to related nodes, such as via node identifiers that correlates to concepts. An interface module queries the embeddings to identify embeddings associated with node identifiers using at least a portion of a query, which can be received via an interface of the semantic network platform. Updates to the resource cause incremental, trackable updates in portions of related nodes and related embeddings such that queries can be executed against update histories, which may not be natively accessible by querying a point-in-time version of the resource.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Computing Environment

FIG. 1 is a system diagram illustrating an example of a computing environment in which the disclosed system operates in some implementations. In some implementations, environment 100 includes one or more client computing devices 105A-D, examples of which can host the semantic network platform 200 of FIGS. 2A-2B. Client computing devices 105 operate in a networked environment using logical connections through network 130 to one or more remote computers, such as a server computing device.

In some implementations, server 110 is an edge server which receives client requests and coordinates fulfillment of those requests through other servers, such as servers 120A-C. In some implementations, servers 110 and 120, or associated computing devices, comprise computing systems, such as the semantic network platform 200 of FIGS. 2A-2B. Though each server 110 and 120, or associated computing device, is displayed logically as a single server, server computing devices can each be a distributed computing environment encompassing multiple computing devices located at the same or at geographically disparate physical locations. In some implementations, each server 120 corresponds to a group of servers.

Client computing devices 105 and servers 110 and 120, or associated computing devices, can each act as a server or client to other server or client devices. In some implementations, servers (110, 120A-C) connect to a corresponding database (115, 125A-C). As discussed above, each server 120 can correspond to a group of servers, and each of these servers can share a database or can have its own database. Databases 115 and 125 warehouse (e.g., store) information such as claims data, email data, call transcripts, call logs, policy data and so on. Though databases 115 and 125 are displayed logically as single units, databases 115 and 125 can each be a distributed computing environment encompassing multiple computing devices, can be located within their corresponding server, or can be located at the same or at geographically disparate physical locations.

Network 130 can be a local area network (LAN) or a wide area network (WAN) but can also be other wired or wireless networks. In some implementations, network 130 is the Internet or some other public or private network. Client computing devices 105 are connected to network 130 through a network interface, such as by wired or wireless communication. While the connections between server 110 and servers 120 are shown as separate connections, these connections can be any kind of local, wide area, wired, or wireless network, including network 130 or a separate public or private network.

Semantic Network Platform

Figure 2A:
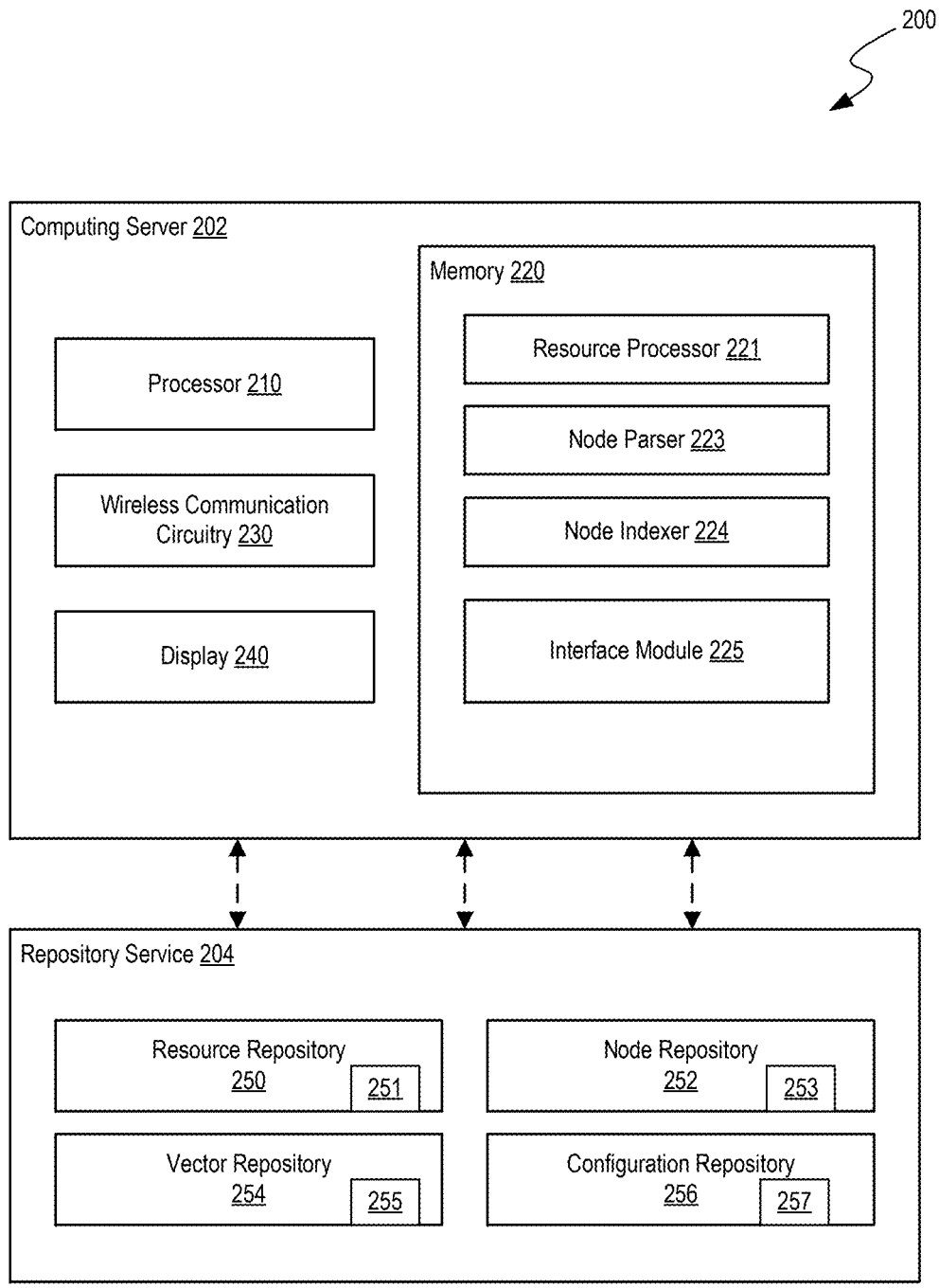
FIG. 2A is a block diagram illustrating an example semantic network platform, according to some implementations of the present technology.

FIG. 2A is a block diagram illustrating an example semantic network platform 200. The components shown are merely illustrative, and well-known components are omitted for brevity. As shown in FIG. 2A, the computing server 202 includes a processor 210, a memory 220, a wireless communication circuitry 230 to establish wireless communication and/or information channels (e.g., Wi-Fi, internet, APIs, communication standards) with other computing devices and/or services (e.g., servers, databases, cloud infrastructure), and a display 240 (e.g., user interface). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a repository service 204 that is hosted alongside the computing server 202 on the core network 106 described in reference to FIG. 1. As shown, the repository service 204 can include a resource repository 250 configured to store resources 251, a node repository 252 configured to store nodes 253, a vector repository configured to store embeddings 255, and/or a configuration repository configured to store configuration information 257.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional, or alternative, embodiments, the processor 210 can store temporary information onto the memory 220 and store long-term data onto the repository service 204. The memory 220 is merely an abstract representation of a storage environment. Hence, in some embodiments, the memory 220 comprises one or more actual memory chips or modules.

As shown, modules of the memory 220 can include a resource processor 221, node generator 222, node parser 223, node indexer 224, and interface module 225. Other implementations of the computing server 202 include additional, fewer, or different modules, or distribute functionality differently between the modules. As used herein, the term "module" and/or "engine" refers broadly to software components, firmware components, and/or hardware components. Accordingly, the modules 221-225 could each comprise software, firmware, and/or hardware components implemented in, or accessible to, the computing server 202.

While or after a resource 251 (e.g., a document, such as a resume) is ingested into the semantic network platform 200, the resource 251 undergoes a series of processing operations to extract relevant information and create a structured representation of its content. The resource processor 221 breaks down (e.g., using the node generator 222 and/or a node parser 223) the resource 251 into sections or chunks based on dynamically identified concepts, such as work experience, education, and skills. The node generator 222 generates code, such as Cypher queries, to create nodes 253 in the graph database that represent the extracted concepts and entities. The node indexer 224 vectorizes the nodes 253 using techniques such as word embeddings or graph embeddings, allowing for efficient querying and retrieval of the nodes 253. The interface module 225 queries the vectorized node embeddings 255 to retrieve relevant information and provide insights into the resource content.

In some implementations, the resource processor 221 performs resource 251 retrieval and ingestion. Resource 251 ingestion involves processing documents in multiple formats, such as image files (e.g., .bmp, .jpg), video files, text files (.txt), spreadsheets (.csv, .xlsx), presentations (.pptx), and PDF files (.pdf). This allows the semantic network platform 200 to handle a range of documents and file types. For example, in some implementations, the resource processor 221 ingests documents using loaders that support various document formats. These loaders can extract data from documents in formats such as spreadsheet files, presentation files, text files, and PDF files. The loaders can include routing logic to handle documents with different file extensions, including .csv, .xlsx, .pptx, .txt, and .pdf. For example, the resource processor 221 can process text files using UTF-8 encoding, spreadsheets in CSV format with comma-separated values, and PDF files using a PDF parsing library. This information and/or executables (e.g., loader executables) can be stored, in the form of configuration information 257, in the configuration repository 256. This enables the semantic network platform 200 to extract information from different types of resources 251 and integrate them into a unified representation.

In some aspects, the disclosed techniques enable integration of data in various modalities, such as text, images, video, audio, and computer code, into knowledge graphs. In some examples, to process images, the resource processor 221 can perform pre-processing operations to generate textual descriptions. This can involve computer vision techniques such as object detection, scene understanding, and image classification. In some examples, the resource processor 221 can use convolutional neural networks (CNNs) to detect objects in images and generate textual descriptions of the objects. The resource processor 221 can also use techniques such as optical character recognition (OCR) to extract text from images.

In some examples, the resource processor 221 can process audio data to generate transcripts. This can involve speech recognition techniques such as automatic speech recognition (ASR) to transcribe spoken words into text. In some examples, the resource processor 221 can use machine learning models trained on large datasets of audio recordings to recognize patterns in speech and generate accurate transcripts.

In some examples, the resource processor 221 can perform static or dynamic analysis of computer code to generate textual descriptions. This can involve techniques such as abstract syntax tree (AST) analysis to parse the structure of code and generate descriptions of the code's functionality. In some examples, the resource processor 221 can use dynamic analysis techniques such as runtime analysis to understand the behavior of code and generate descriptions of its execution. By analyzing computer code, the resource processor 221 can generate textual descriptions that can be integrated into the knowledge graph, enabling better understanding and analysis of the code.

In some implementations, the resource processor 221 segments documents into smaller sections or chunks. This can be done using various chunking strategies, such as fixed-size chunking with a chunk size of 100 words, content-based chunking using section headings (e.g. "Work Experience", "Education"), or page-based chunking with a page size of P (e.g., 1, 2, 10, 100) pages. For instance, a document can be divided into chunks based on escape sequences (e.g., "\n"), end-of-record identifiers, sections, paragraphs, or sentences using natural language processing techniques such as sentence tokenization.

In some implementations, the node parser 223 performs chunking operations based on dynamically identified concepts in input documents. Chunking strategies can include fixed-size chunking with a fixed window size, content-based chunking using named entity recognition (NER) to identify key entities, and page-based chunking using page layout analysis to identify section boundaries. Hybrid approaches can also be used, combining multiple chunking strategies to create more meaningful and relevant chunks.

In some implementations, dynamic chunking can be achieved using neural networks, such as large language models (LLMs), small language models (SLMs), etc., to identify tokens and chunk documents based on semantic meaning. The LLM can be trained on a diverse range of text data, including but not limited to, resumes, technical reports, academic papers, and other document types. The LLM can be trained on a large corpus of text data that includes annotated examples of chunk boundaries, allowing the model to learn the patterns and structures of different document types. This training data can include labeled examples of section headings, paragraph breaks, and sentence boundaries, enabling the LLM to identify and chunk documents based on semantic meaning. The training data for the LLM can also include a wide range of document formats and structures, such as documents with varying levels of nesting, tables, figures, and other complex layouts. By training on this diverse range of data, the LLM can develop a robust understanding of document structure and learn to chunk documents accurately and effectively. For example, the LLM can be trained on a dataset that includes thousands of resumes, each annotated with chunk boundaries and labels for different sections such as "Work Experience" and "Education". The model can also be trained on a dataset of technical reports, annotated with chunk boundaries and labels for sections such as "Introduction", "Methods", and "Results". By training on these datasets, the LLM can learn to identify and chunk documents based on the specific structures and patterns of each document type. In another example, a transformer-based model can be used to identify tokens and chunk documents based on contextual understanding. The model can be trained on a corpus of text data and fine-tuned for specific document types, such as resumes or technical reports. This approach enables the model to learn the nuances of different document types and chunk them accordingly.

In some implementations, dynamic chunking using LLMs is used to identify nested or hierarchical structures in documents. For instance, a document may have a section on "Work Experience" that contains multiple sub-sections for different job roles. An LLM can be used to identify these nested structures and chunk the document accordingly, allowing for more precise and meaningful representation of the document's content. In some implementations, such as when a document or URL is included within another document, a loader can be invoked to access and process the corresponding resource (e.g., open nested document, navigate to URL).

In some implementations, the resource processor 221 links concepts within a resource 251 (e.g., within a chunk) based on shared relationships. This involves identifying relationships between distinct concepts within the chunks, and creating links between them based on shared relationships or entities. For example, a resume can include multiple mentions of a company name, job title, and dates of employment. The resource processor 221 can link these concepts together—for example, based on their proximity in the text. For instance, if the text mentions "John worked at Google as a software engineer from 2010 to 2015", the proximity of the concepts "John", "Google", "software engineer", "2010", and "2015" can indicate that they are related to each other.

The resource processor 221 can use various techniques to identify and link concepts, including named entity recognition (NER) to identify specific entities such as company names and job titles, part-of-speech tagging to identify the grammatical structure of the text, and dependency parsing to identify the relationships between entities. In addition to proximity, the resource processor 221 can also use semantic analysis techniques, such as word embeddings, to identify relationships between concepts based on their meaning. For example, the resource processor 221 can use word embeddings to identify that "software engineer" and "programmer" are related concepts, even if they are not mentioned in close proximity in the text. The resource processor 221 can also use techniques such as coreference resolution to identify relationships between entities that are referred to using different terms, such as "John" and "he".

To illustrate, a resume can include two distinct chunks: "John worked at Google as a software engineer from 2010 to 2015" and "During his tenure at Google, John developed multiple projects using Java and Python". The resource processor 221 can process these chunks by first extracting the chunks from the resume, then extracting concepts from each chunk, including entities such as "John", "Google", "software engineer", "Java", and "Python". The resource processor 221 can then normalize the extracted concepts to ensure consistency and accuracy, standardizing the company name "Google" to a single representation, for example. The resource processor 221 can identify related chunks based on shared concepts, linking the concepts in the two chunks together because they both mention "John" and "Google". This creates a network of relationships between entities, enabling better search, retrieval, and analysis of document content.

In some implementations, the resource processor 221 can normalize identified entities to ensure consistency and accuracy. For example, the processor can resolve the company name "Google" to a single representation, even if it appears as "Google Inc." or "Google LLC" in different chunks or chunk segments. As another example, the resource processor 221 can normalize dates and job titles to a standard format. This normalization enables the platform to link chunks based on shared concepts, even if the concepts are represented differently in the original text.

In some implementations, a chunk can include a set of concepts that the resource processor 221 can recognize as sets of related nodes 253. For instance, a chunk from the resume might include concepts such as "software engineer", "Google", and "2010-2015". The resource processor 221 can identify these concepts and link them together based on their proximity in the text. For example, the processor can create a node 253 triple to represent the relationship "John worked at Google as a software engineer from 2010 to 2015", which can be represented as (John, worked-at, Google) with additional node 253 attributes to represent the job title and dates of employment.

In some implementations, the resource processor 221 can represent the relationships between entities as node 253 triples in a knowledge graph by generating node 253 triples. Other relationships represented in knowledge graphs can include N-ary relationships, hypergraphs, graphlets, context-dependent relationships, temporal relationships, and so forth. To that end, nodes and/or relationships can include properties and/or embeddings that can encode the information sufficient to model relationships (e.g., path sequence numbers, timestamps, node types, relationship types, and so forth). A node 253 triple can include a subject, predicate, and object, which can represent a wide range of relationships, including hierarchical relationships (e.g., "car" is a subclass of "vehicle"), causal relationships (e.g., "exercise causes happiness"), spatial relationships (e.g., "Paris is located in France"), temporal relationships (e.g., "World War II occurred before the Cold War"), semantic relationships (e.g., "big" is a synonym of "large"), part-whole relationships (e.g., "a car has wheels"), attribute relationships (e.g., "John has a height of 180 cm"), event relationships (e.g., "John participated in the meeting"), instance relationships (e.g., "Albert Einstein is an instance of physicist"), and similar-to relationships (e.g., "cats are similar to dogs").

In some implementations, the resource processor 221 can add node 253 attributes to the node 253 triple to represent complex relationships. For instance, the resource processor 221 can add attributes such as "job-title" and "dates-of-employment" to the node 253 triple, which can represent the specific details of John's employment at Google. The resource processor 221 can also use reification to represent more complex relationships, such as "John's work experience includes multiple projects that demonstrate his skills in software development", which can be represented as a set of node 253 triples that capture the specific projects and skills involved.

More generally, the resource processor 221 can perform proximity-based and/or semantic linking operations to encode relationships, such as node triples and higher-order relationships. For example, higher-order relationships can include N-ary relationships, which involve more than two entities and can, in some cases, be represented using multiple triples or reification. For example, the relationship "John participated in the meeting with Mary" includes multiple triples to capture the relationship between John, the meeting, and Mary. For example, higher-order relationships can include relationship qualifiers, such as properties or attributes of relationships. For example, higher-order relationships can include similar-to relationships, such as "Cats are similar to dogs in terms of their loyalty".

In some implementations, by using entity extraction, normalization, proximity-based linking, semantic linking, and/or node 253 triples, the resource processor 221 can create a knowledge graph that represents complex relationships between entities within a single document. This knowledge graph can enable better search, retrieval, and analysis of document content, and can be used to support a wide range of applications, including question answering, entity disambiguation, and text summarization.

In some implementations, the resource processor 221 can invoke the node generator 222 to create nodes 253 in a graph structure, where each node 253 represents a specific concept or entity. The nodes 253 are linked based on their relationships, allowing the semantic network platform 200 to query and reason over the document's content in a more structured and meaningful way.

For example, the resource processor 221 can generate a prompt for a particular chunk, including inputs such as the first concept, second concept, relationship, properties, and source metadata, such as resource 251 identifiers, chunk identifiers, and chunk hashes. The prompt is then sent to a large language model (LLM), which is trained to generate Cypher code to create nodes 253. Cypher and Neo4j are merely examples of query languages and graph databases that can be used, and other alternatives may also be suitable.

The LLM receives the prompt and generates Cypher code based on the inputs, "CREATE (n: Concept such as {name: 'Concept1'})-[: RELATED_TO {type: 'Relationship-Type'}]-> (m: Concept {name: 'Concept2'})". The generated Cypher code is then inserted into Python code stubs retrieved from the configuration repository 256. The Python code stubs include commands to execute the Cypher code in the node repository 252, such as a Neo4j database, using the URL, password, and username.

The semantic network platform 200 can then cause the execution of the Python code, which creates the nodes 253 and relationships in the node repository 252. The platform can compare consecutive Cypher statements generated from multiple documents (resources 251) to ensure that the relationships and nodes 253 created from various documents (resources 251) do not conflict or cause data inconsistencies.

In some cases, when Cypher statements are uploaded, there may be conflicts in variable names, especially when integrating data from different documents (resources 251). To resolve this, the semantic network platform 200 can replace creation commands with merge commands in the Cypher statements, such as "MERGE (n: Concept {name: 'Concept1'})-[: RELATED_TO {type: 'Relationship-Type'}]-> (m: Concept {name: 'Concept2'})". This ensures that no data is lost or duplicated when integrating data from different sources, maintaining the integrity of the knowledge graph.

Nodes 253 in the knowledge graph can represent complex relationships between entities, enabling better search, retrieval, and analysis of document content. The semantic network platform 200 can visualize the graph and inspect relationships across documents (resources 251), providing a more comprehensive understanding of the data.

In some implementations, the semantic network platform 200 tracks changes to its content or metadata over time, allowing for versioning and auditing of a particular chunk in a resource 251. When a new version of a particular resource 251 is received, the platform cross-references the resource repository 250 to identify the previously used chunking algorithm for that resource 251. The platform then applies the same algorithm to parse the new version of the resource 251, dividing it into chunks.

In some implementations, to track changes in resources 251 (e.g., content changes in documents), the platform applies a hash algorithm, such as SHA-256 or MD5, to chunks, concepts, tokens, or other units or segments of resources 251. The hash values of the new unit are compared to the hash values of the previous units to identify any changes or updates. The new units are then stored relationally to the resource 251, along with unit version information, unit update information, and unit content information.

In some implementations, the semantic network platform 200 stores hashes of new units, allowing for efficient tracking of changes and updates over time. This enables the semantic network platform 200 to maintain a version history of the units, providing a comprehensive audit trail of changes made to the resource 251. By tracking changes at the unit level, the platform can enable explainability via detailed insights into the evolution of the resource 251 over time.

In some implementations, the node generator 222 can be prompted to generate nodes 253 or update existing nodes 253 only for new units that have been identified as changed or updated. When updating existing nodes 253, the node generator 222 can include node versioning properties, metadata, and attributes that correspond to the unit versioning information for units of resources 251. For example, the node generator 222 can add version numbers, timestamps, or other metadata to the nodes 253 to reflect the changes made to the corresponding units. Accordingly, the units can correspond to nodes, sets of nodes, and/or subsets of nodes (e.g., node properties).

By updating existing nodes 253 with versioning information, the semantic network platform 200 can maintain a consistent and accurate representation of the knowledge graph over time. This enables the platform to provide more accurate search, retrieval, and analysis results, and to support more informed decision-making.

In some implementations, the node indexer 224 can generate embeddings 255 for the nodes 253 in the knowledge graph. One example way to generate embeddings 255 is by using a neural network, such as a pre-trained LLM. An example suitable LLM, AWS Titan, has a maximum embedding size (number of dimensions) of 1,024, which means that it can capture complex semantic relationships between nodes. More generally, vectors of embeddings 255 can be generated according to a criterion N, where N can include a minimum vector size, maximum vector size, or another suitable quantity. In an example, to generate embeddings 255 using an LLM, the node indexer 224 converts the text associated with each node 253 into an N-dimensional vector representation. The vector representation captures the semantic meaning of the node's text, allowing for meaningful comparisons between nodes 253. The node indexer 224 feeds the text of each node into the LLM, which processes the information and outputs an embedding. Embeddings 255 can take various forms, depending on the specific application and model used. For example, a fixed-size embedding can be a 1024-dimensional vector representation of a word or phrase, such as [0.1, 0.2, 0.3, . . . , 0.9] (a vector with 1024 elements). For example, a vector can be a numerical representation of a piece of text, such as [0.5, 0.2, 0.1, 0.8] (a vector with 4 elements). For example, a numerical value can be a single number that represents a feature or attribute, such as 0.75 (a single numerical value). Embeddings 255 can also have varying lengths or structures, such as a hierarchical embedding, which is a tree-like structure where each data point has a vector representation, and the structure of the tree varies depending on relationships between the data points. For example, a graph embedding can be a representation of a graph structure, where each node and edge has a vector representation, and the structure of the graph varies depending on the input data.

The resulting embeddings 255 are stored in a vector repository 254, such as FAISS, which enables fast and efficient similarity search. The vector repository 254 enables the node indexer 224 and/or interface module 225 to quickly and accurately match nodes based on their semantic content, making it possible to query relationships and patterns in the knowledge graph and identify additional relationships. The node indexer 224 therefore enables fast and efficient querying and retrieval of nodes 253, enabling a range of applications such as semantic search, recommendation systems, and knowledge discovery.

In some implementations, the interface module 225 can facilitate synchronized communication with repository service 204 and other systems, such as control entity computing systems that submit queries to retrieve information about resources 251, nodes 253, and embeddings 255. A control entity computing system can be a customer computing system, user computing system, query agent, and the like, seeking to query the semantic network platform 200 for specific information.

The interface module 225 can implement various communication protocols (e.g., WebSocket, Server-Sent Events, long polling) to establish and maintain a synchronized communication channel with repository service 204 and/or control entity computing system(s). This synchronized communication can enable real-time bidirectional data exchange, allowing repository service 204 and/or control entity computing system(s) to receive immediate updates and send queries without significant latency.

In some cases, the interface module 225 can process query requests received from the repository service 204 and/or control entity computing system(s). These query requests can include queries for specific nodes 253 associated with resources 251, queries for embeddings 255 that represent certain concepts or relationships, or requests to analyze the semantic network. The interface module 225 can parse and validate these requests, ensuring they are properly formatted and comprise all necessary parameters before forwarding them to the appropriate components of the semantic network platform 200 for processing.

In some implementations, the interface module 225 can leverage the display 240 of the computing server 202 to present query results to the repository service 204 and/or control entity computing system(s). The interface module 225 can generate and update user interface elements, such as charts, graphs, or text displays, to visualize aspects of the query results, including the relationships between resources 251, nodes 253, and embeddings 255. This can enable users to gain insights into the semantic network and make informed decisions based on the query results.

Example Entities of the Semantic Network Platform

Figure 2B:
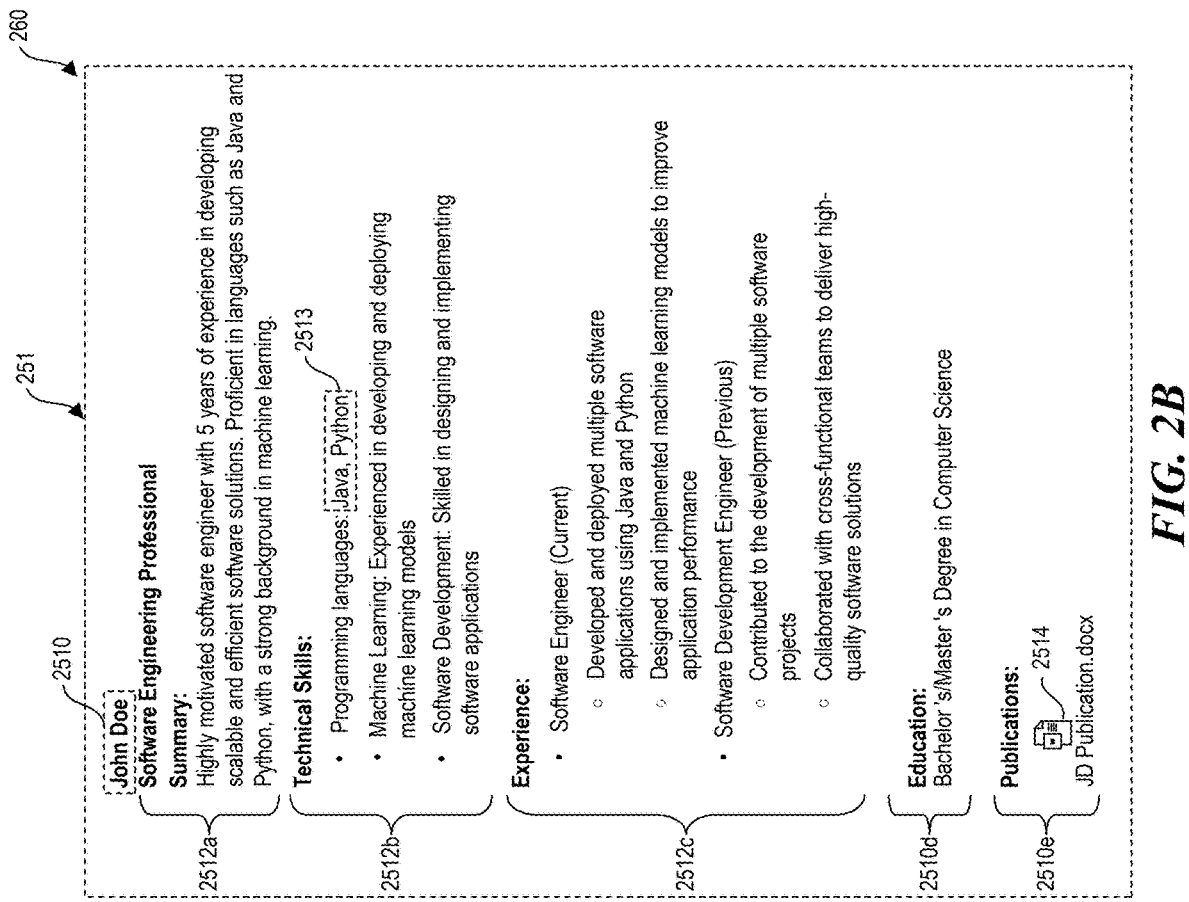
FIG. 2B illustrates aspects of a resource, such as a document, of a resource repository, where the resource can be generated using a resource processor of the example semantic network platform, according to some implementations of the present technology.

FIGS. 2B, 2C, and 2D illustrate implementations of entities of the semantic network platform 200. Entities can include resources 251, nodes 253, and embeddings 255. The example illustrated aspects of these entities include entity identifiers, entity properties, entity attributes, entity metadata, entity relationships, and entity versioning. Although shown in JSON form, the implementations can be conceptualized or implemented in various suitable ways, such as entity-relationship diagrams, knowledge models, flowcharts that outline the logic of entity interactions, state machines that manage entity transitions, data structures like arrays, dictionaries, linked lists, or graphs, program classes like object-oriented classes or abstract data types, function calls like APIs, methods, library functions, computer-executable code, microchips, ASICs, and/or computer hardware configurations.

FIG. 2B is a diagram 260 that illustrates aspects of a resource 251, such as a document, of the resource repository 250. The document can be an input document received or acquired by the resource processor 221 for generating a knowledge graph representation of the input document to facilitate query operations on content or metadata of the input document. The resource 251 can be generated and/or updated using a resource processor 221 of the semantic network platform 200. As shown, the resource 251 can include a concept identifier 2510, which corresponds to a unit within the input document or to a textual or alphanumeric representation of a translated unit from a non-textual input document, such as an image file, a video file, an audio file, or a code snippet.

The concept identifier 2510 can relate to a set of chunks (2512a-e). One or more of the set chunks (2512a-e) can include additional concept identifiers 2513 and/or related resource identifiers 2514. As shown, the related resource identifier 2514 identifies an additional document linked to the input document (e.g., a publication file included in a resume). In various implementations, the related resource identifiers 2514 can include hyperlinks, URLs, file paths, file names, library references, configuration information, and/or other information sufficient to identify addressable related resources. For example, related resource identifiers 2514 can include links to code repositories that demonstrate examples of work done by an individual whose professional profile is described in a resume.

FIG. 2C illustrates aspects of a node 253, such as a knowledge graph node, of the node repository 252. The node 253 can be generated by the node generator 222 of the semantic network platform 200. As shown, the node 253 includes a node identifier 2530, which can be a copy or a derivative of the concept identifier 2510. In the example shown, the concept identifier 2510 refers to an individual, and the node identifier 2530 encodes information about the individual (e.g., via relationships 2531 and/or properties 2533).

Relationships 2531 can include information sufficient to generate node triples, representing connections between entities in the form of subject-predicate-object (S-P-O) triples. For instance, a resume testing pipeline encoded in a knowledge graph can utilize an S-P-O relationship like "resume-tested on-resume testing pipeline", where "resume" is the subject, "tested on" is the predicate, and "resume testing pipeline" is the object. Similarly, an example node triple might represent the relationship "input concept-tested on-reference concept", capturing the connection between the input concept and the reference concept through the "tested on" predicate. These S-P-O triples enable efficient representation and querying of relationships between entities, facilitating analysis and processing of complex data.

Properties 2533 can include attributes extracted from or derived using the input document, such as skills listed on a resume. As shown, to reflect a history of updates to the skills chunk 2512b of the input document, the node 253 includes an update_history property. The update_history property includes encoded information about the history (2532a-c) of changes. Items in the history of changes are shown to include nested properties 2533, time stamps 2534, and references to corresponding encoded units, such as embeddings (255a, 255b, 255c). As shown, the nested properties 2533 in the update history correspond to version identifiers of the input document. In some implementations, references to corresponding encoded units can include other encoded data, such as hashes, and/or reference data, such as pointers.

FIG. 2D illustrates aspects of an embedding 255, such as a vector and/or relation representations in a vector space of a vector repository 254. The embedding 255 is generated by the node indexer 224 of semantic network platform 200. As shown, the embedding 255 includes an embedding identifier 255c, which is sufficient to cross-reference the embedding 255 with its corresponding node 253. As shown, the embedding 255 includes an N-dimensional vector 2551, which can encode properties and/or relationships of the corresponding node 253. The embedding 255 can be associated with embedding properties or metadata, such as number of dimensions N, data type, time stamps, source document or concept or resource identifier 251, similarity metrics, and so forth. The embedding 255 can be associated with a node reference set 2554. The node reference set 2554 can correspond to a history of updates in the node that corresponds to the node identifier 2530. For example, the node reference set 2554 can include encoded information about the history (2555a-c) of changes, where the changes track the changes captured in the update history of a node that corresponds to the node identifier 2530.

Continuing with the resume example, a history of updates to the skills chunk 2512b of the input document (John Doe's resume) is tracked in the update history of the node 253 and is reflected in the corresponding embeddings 255a-c. This enables a variety of insightful queries against the embeddings 255a-c, such as "When did John Doe add expertise in data science to his resume?" or "How has John Doe's proficiency in programming languages evolved over time?" or "When did John Doe first list machine learning on his resume" or "How many years of experience does John Doe have with machine learning?" Additional questions that can be answered include "Which projects did John Doe apply machine learning to?", "How has John Doe's use of machine learning changed over the course of his career?", and "What other skills or technologies has John Doe frequently paired with machine learning in his projects?" By leveraging the node and embedding updates, it is possible to gain a deeper understanding of John Doe's skill development, project experience, and technical expertise, and answer questions that wouldn't be easily answerable from the source document alone.

One of skill in the art will appreciate that various implementations, not necessarily depicted in the FIGS. 2B, 2C, and 2D for the sake of readability, are contemplated. Entities can be thought of as units, and various levels of granularity can be used to represent input documents and their respective units (subsets or supersets). For example, in various implementations, a unit can denote a subset or a superset of entire documents, sets of documents, chunks, sets of chunks, concepts, sets of concepts, tokens, sets of tokens, relationships, relationship properties, and/or embeddings. Accordingly, the operations described herein can apply to various data structures, where a particular unit can be represented as a node, a related set of nodes, a nested node or set of nodes, and/or a node property. Unit relationship cardinalities can take any suitable form, such as one-to-one, one-to-many, many-to-one, and/or many-to-many (or, in cases where entities are combined or some aspects of an implementation are omitted, one-to-none). To illustrate, a concept can include or relate to multiple chunks, and a chunk can include or relate to multiple concepts. Similarly, a document can include or relate to multiple concepts, and a concept can be part of multiple documents. A chunk can include or relate to multiple embeddings, and an embedding can represent multiple chunks. A concept can be related to multiple other concepts. An embedding can be associated with multiple nodes, and a node can have multiple embeddings. The contemplated relationships can be complex and varied, and the platform can support a wide range of entity relationships and structures.

Query Techniques Using the Semantic Network Platform

The semantic network platform 200 enables similarity-based query techniques by executing queries against embeddings 255 that correspond to nodes 253 in a knowledge graph, which in turn correspond to concept or resource identifiers 251 extracted or generated based on source documents. This approach addresses the context window size problem that arises when querying documents directly. Context window size refers to the limited amount of text that can be processed by a model at one time. For example, known models have context window sizes ranging from tens of thousands to hundreds of thousands of tokens or more, such as Llama 3.1 with a context window size of up to 128,000 tokens (approximately 80-100 KB or 64-80 pages of text), Claude 3.5 with a context window size of up to 200,000 tokens (approximately 160-200 kB or 128-160 pages of text), and OpenAI GPT-3.5 with a context window size of up to 4,000 tokens (approximately 3-4 kB or 2-4 pages of text). The estimated size of the knowledge graph is significantly smaller, allowing for more efficient and targeted querying.

Additionally, FAISS and similar conventional frameworks are designed for similarity search and clustering in vector spaces, but they do not natively support knowledge graphs. The knowledge graph approach enabled by the semantic network platform 200 provides additional advantages, including multi-hop querying, semantic search, relationship-aware querying, and contextualized querying. These capabilities enable the knowledge graph to capture complex relationships between entities and concepts, providing more accurate and relevant results. Furthermore, the knowledge graph approach described herein provides a more interpretable and explainable querying framework, allowing users to understand the reasoning behind the results and identify potential biases or errors in the data.

Figure 3A:
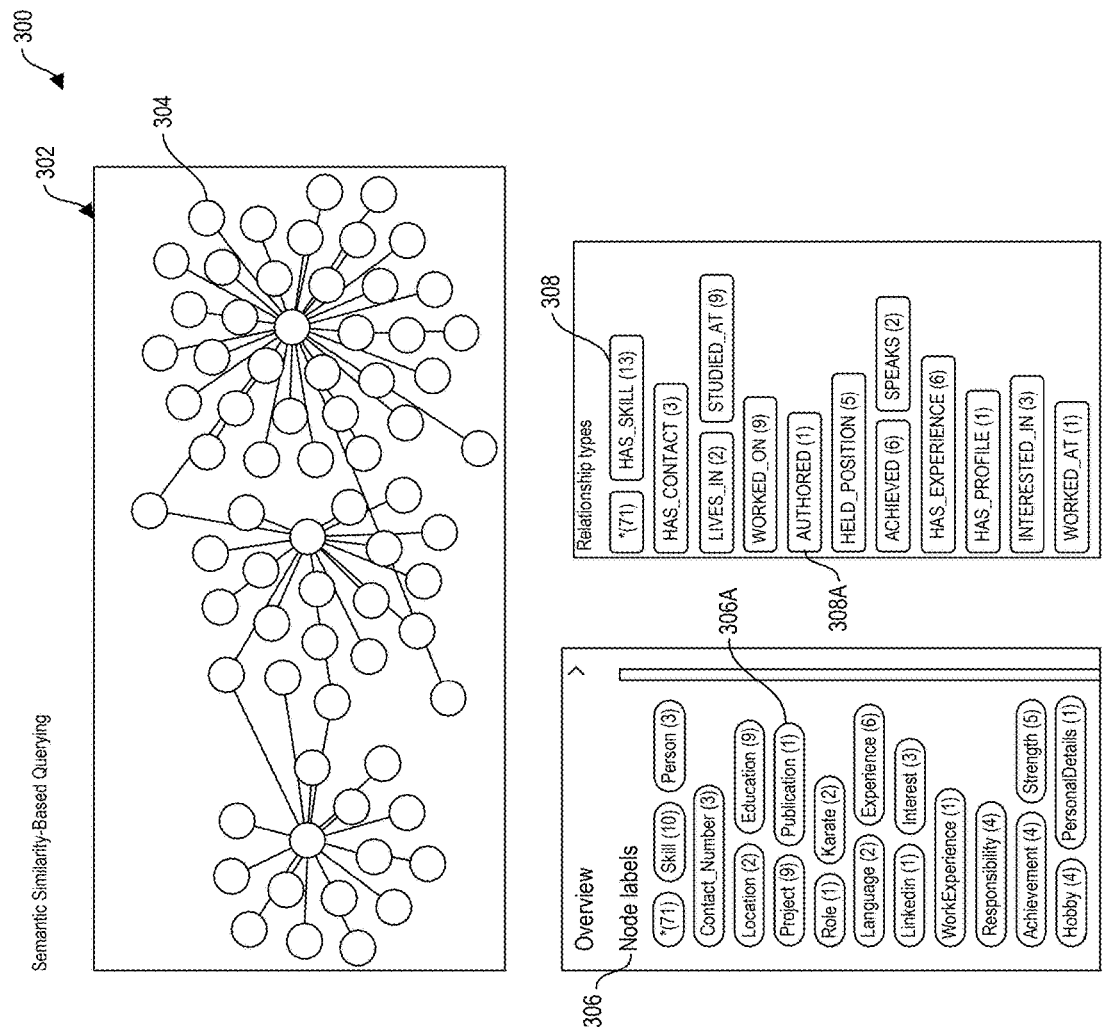
FIG. 3A illustrates similarity-based query techniques using the example semantic network platform, according to some implementations of the present technology.
Figure 3B:
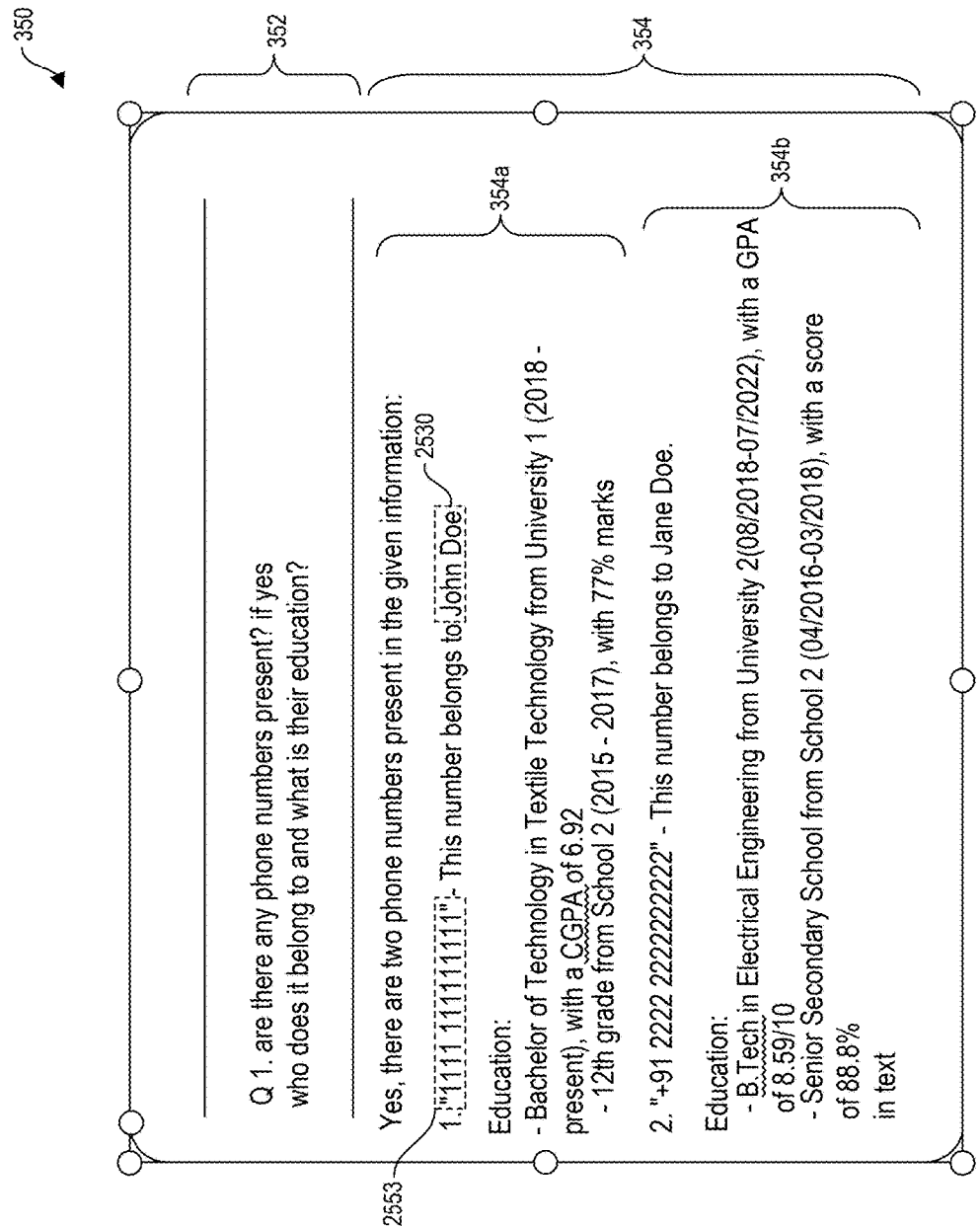
FIG. 3B illustrates an example query of the semantic network platform, according to some implementations of the present technology.

FIG. 3A illustrates similarity-based query techniques 300 using the semantic network platform 200, and FIG. 3B illustrates an example query, according to some implementations of the present technology. As shown, the knowledge graph 302 can include a set of nodes 304, connected (e.g., in the S-P-O form) via relationships 306 (e.g., encoded or stored as node labels). The relationships can be of various relationship types 308, which can be inferred using semantic and/or proximity analysis applied to tokens in source document chunks.

The knowledge graph 302 is constructed by extracting entities and relationships from source documents through natural language processing (NLP) techniques. Tokens in the source document chunks are analyzed to identify entities, concepts, and relationships, which are then represented as nodes 304 and relationships 306 in the knowledge graph 302. The relationships 306 between nodes 304 can be determined based on co-occurrence, for example, with a co-occurrence threshold of at least 5 instances within a 50-token window; semantic similarity, for example, with a cosine similarity score of at least 0.7; or other proximity metrics, such as, for example, a sentence-level co-occurrence frequency of at least 0.2. Entities that frequently co-occur in the same document chunk with a high frequency (e.g., above the co-occurrence threshold) may be inferred to have a relationship, while entities with similar semantic meanings (e.g., above the cosine similarity score threshold) may be connected via a specific relationship type 308. The resulting knowledge graph 302 provides a structured representation of the relationships between entities and concepts, enabling efficient querying and reasoning over the data.

In addition to relationships 306 inferred from content analysis, the knowledge graph 302 can also include relationships 306a or relationship types 308a inferred from properties of the documents or entities. For example, relationships can be inferred based on metadata, such as author, publication date, or document type. Entities that share similar properties, such as being authored by the same person or published in the same journal, can be connected via relationships that reflect these properties. This can enable queries that leverage these relationships, such as identifying all documents written by a particular author or published in a specific time period. By incorporating relationships inferred from properties, the knowledge graph can provide a more comprehensive representation of the entities and their relationships, enabling more accurate and informative query results.

As shown in FIG. 3B, a query 352 can be executed to return an output 354. The output 354 can include a narrative, a result set, and so forth. As shown, the output 354 can include a result set (354a, 354b) generated by querying embeddings that correspond to properties 2553 of nodes identified by node identifiers 2530. Here, the query searches embeddings corresponding to a set of resumes to return a set of nodes responsive to the query 352 about specific information across the resumes (phone numbers) where it is available. Searching the source documents directly could mean searching thousands of resume documents in various formats (text, PDF, .doc) to find such information.

In some use cases, the semantic network platform 200 enhances insurance claim analysis by utilizing concepts related to claim types, policyholder information, and claim status. These concepts are represented as nodes 253 in the knowledge graph, which are connected based on their relationships and attributes. The embeddings 255 generated from these nodes enable semantic search capabilities, allowing for more accurate and efficient claim processing.

In some use cases, the semantic network platform 200 improves customer profiling and insights by mapping relationships between customer data and historical interactions, represented as concepts such as customer demographics, purchase history, and interaction types. These concepts are connected as nodes 253 in the knowledge graph, enabling a comprehensive view of customer behavior. The embeddings 255 generated from these nodes capture the semantic relationships between customer data points, providing valuable insights into customer preferences and behavior.

In some use cases, the semantic network platform 200 facilitates enhanced risk assessment by linking key data points and providing insights based on semantic similarity. Concepts such as risk factors, credit scores, and claim history are represented as nodes 253 in the knowledge graph, which are connected based on their relationships and attributes. The embeddings 255 generated from these nodes enable the identification of patterns and relationships that inform risk assessment, allowing for more accurate and informed decision-making.

In some use cases, the semantic network platform 200 aids in answering frequently asked questions. Concepts such as question types, topics, and relevant information are represented as nodes 253 in the knowledge graph, which are connected based on their relationships and attributes. The embeddings 255 generated from these nodes enable the semantic network platform 200 to identify relevant information and provide accurate answers to frequently asked questions, reducing the need for manual searching and improving response accuracy.

Example Operations of the Semantic Network Platform

Figure 4:
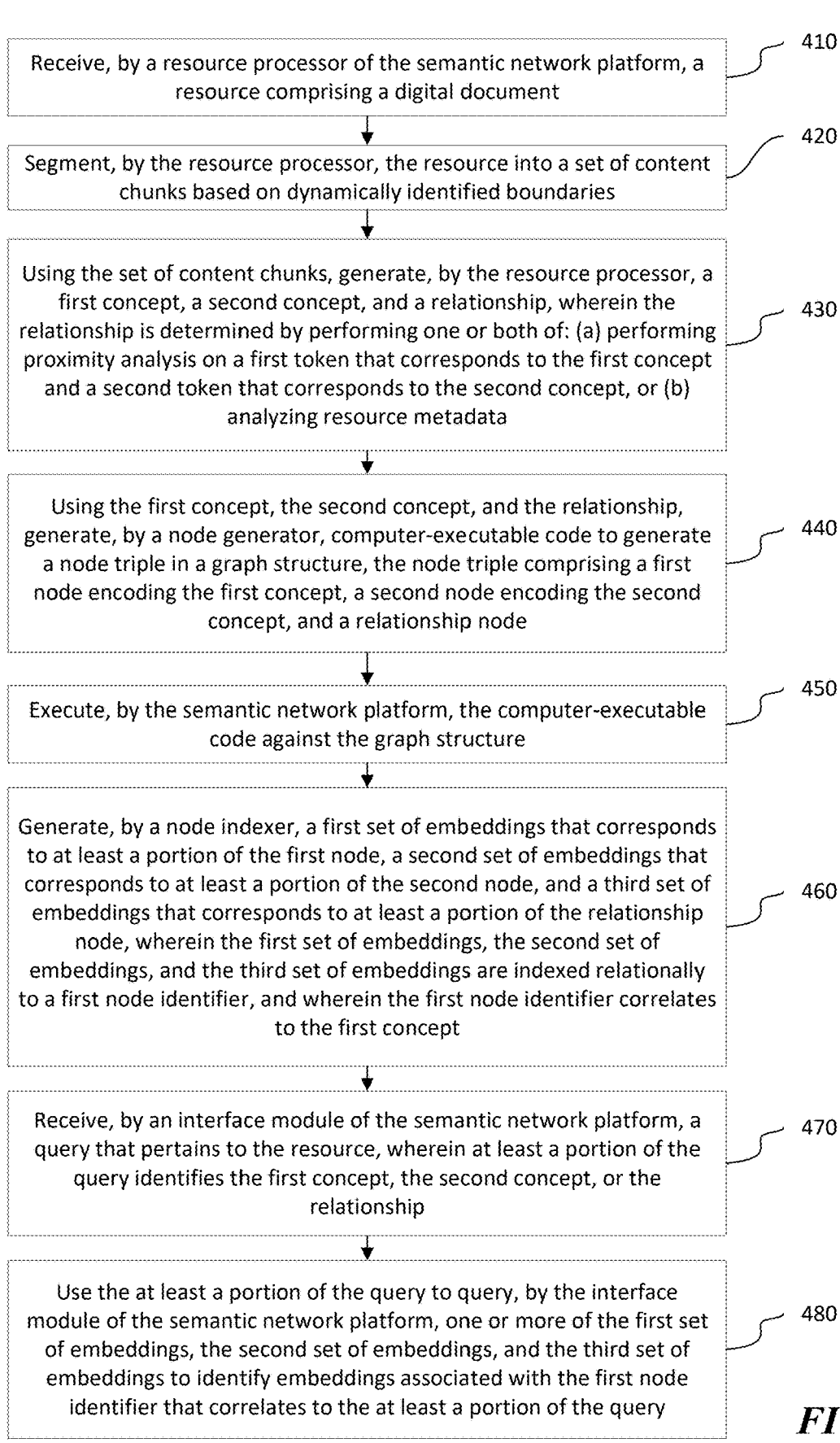
FIG. 4 is a flow diagram that illustrates example operations of the semantic network platform, according to some implementations of the present technology.

FIG. 4 is a flow diagram that illustrates example operations (process 400) of the semantic network platform 200. The process 400 can be performed by a computing system (e.g., semantic network platform 200) that includes at least one hardware processor and at least one non-transitory memory storing instructions, which, when executed by the at least one hardware processor, cause the computing system to perform the process 400. In another example, the computing system includes one or more non-transitory, computer-readable storage media comprising instructions recorded thereon, which, when executed by at least one data processor, cause the system to perform the process 400.

At block 410, process 400 can include receiving, by a resource processor of the semantic network platform, a resource comprising a digital document. In some aspects, the resource is a derivative of computer code, and the semantic network platform includes a pre-processing module that processes the computer code using one or both of static analysis or dynamic analysis to generate a textual or alphanumeric representation of the computer code as the resource. In some aspects, the resource is a derivative of audio data, and the semantic network platform includes a pre-processing module that generates a textual or alphanumeric representation of the audio data as the resource by performing speech-to-text processing. In some aspects, the resource is a derivative of a set of images, and the semantic network platform includes a pre-processing module that generates a textual or alphanumeric representation of content in the set of images by performing computer vision-based analysis.

At block 420, process 400 can include segmenting, by the resource processor, the resource into a set of content chunks based on dynamically identified boundaries, wherein the segmenting comprises applying a chunking algorithm, and wherein the chunking algorithm includes one or more of: content-based chunking using resource section headings, content-based chunking using named entity recognition, page-based chunking, or fixed-size chunking.

At block 430, process 400 can include using the set of content chunks to generate, by the resource processor, a first concept, a second concept, and a relationship, wherein the relationship is determined by performing one or both of: (a) performing proximity analysis on a first token that corresponds to the first concept and a second token that corresponds to the second concept, or (b) analyzing resource metadata. In some aspects, operations can include extracting the second concept from a second resource by accessing the second resource, by the semantic network platform, via an addressable element associated with the first resource.

At block 440, process 400 can include using the first concept, the second concept, and the relationship, to generate, by a node generator, computer-executable code to generate a node triple in a graph structure, the node triple comprising a first node encoding the first concept, a second node encoding the second concept, and a relationship node.

At block 450, process 400 can include executing, by the semantic network platform, the computer-executable code against the graph structure.

At block 460, process 400 can include generating, by a node indexer, a first set of embeddings that corresponds to at least a portion of the first node, a second set of embeddings that corresponds to at least a portion of the second node, and a third set of embeddings that corresponds to at least a portion of the relationship node. The first set of embeddings, the second set of embeddings, and the third set of embeddings are indexed relationally to a first node identifier, and the first node identifier correlates to the first concept.

At block 470, process 400 can include receiving, by an interface module of the semantic network platform, a query that pertains to the resource, wherein at least a portion of the query identifies the first concept, the second concept, or the relationship.

At block 480, process 400 can include using the at least a portion of the query to query, by the interface module of the semantic network platform, one or more of the first set of embeddings, the second set of embeddings, and the third set of embeddings to identify embeddings associated with the first node identifier that correlates to the at least a portion of the query.

Example Machine Learning Architecture

Figure 5:
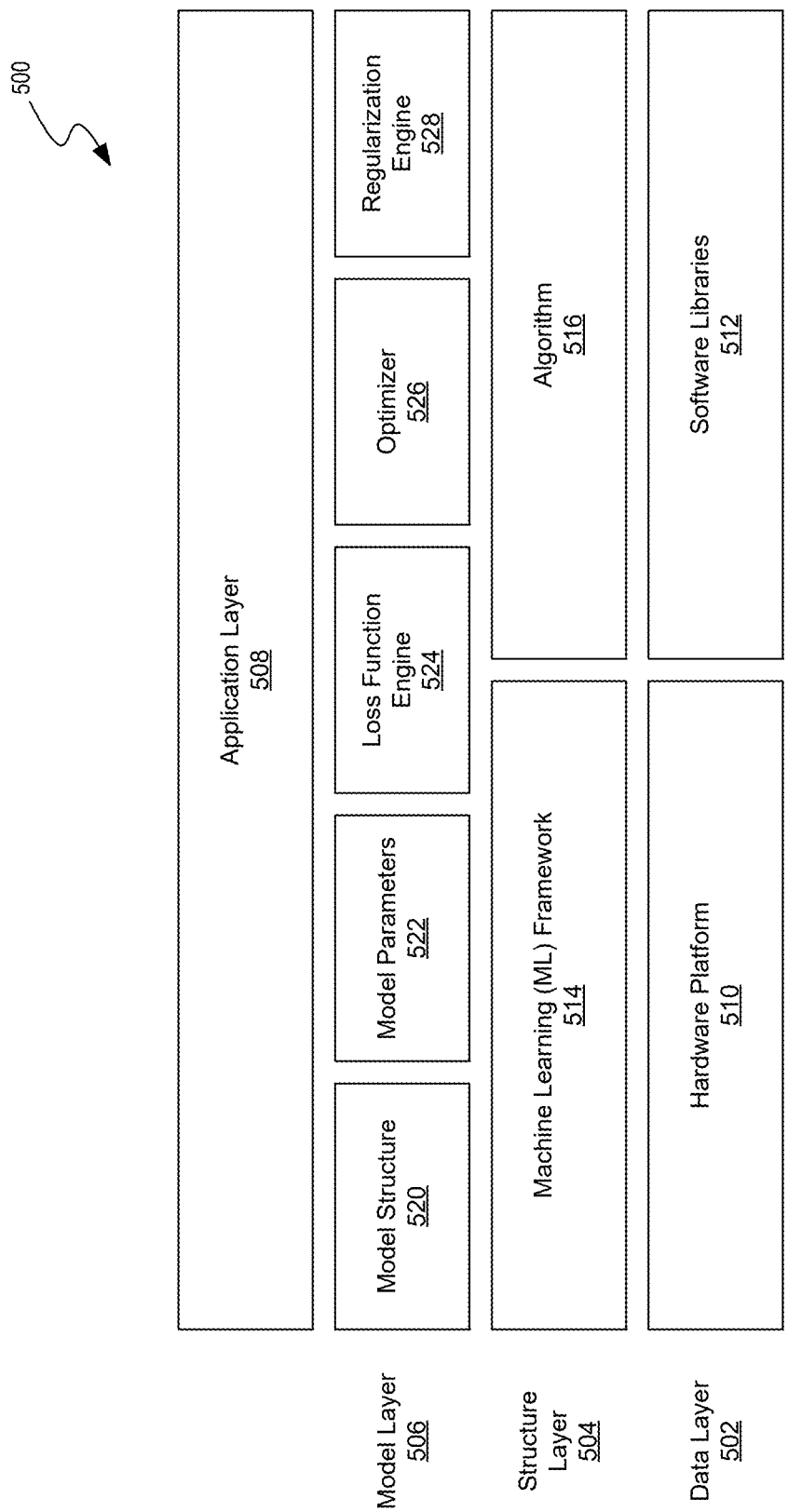
FIG. 5 illustrates a layered architecture of an artificial intelligence (AI) system that can implement the AI/ML models of the semantic network platform in accordance with some implementations of the present technology.

FIG. 5 illustrates a layered architecture of an artificial intelligence (AI) system 500 that can implement the ML models of the semantic network platform 200, in accordance with some implementations of the present technology. Example ML models can include one or more executable statistical inference algorithms stored at computing databases 115, 125 and/or retrieved from external service providers (e.g., a third-party cloud host) via the network 130 of the example computing environment 100. Accordingly, the computing environment 100 and/or components thereof (e.g., servers 110, 120, databases 115, 125, network 130, and/or the like) can include, or be incorporated within, one or more components of the AI system 500. The AI system 500 provides a comprehensive software stack capable of hosting suitable runtime environments for one or more operations of ML models, as further described herein.

The modules of the semantic network platform 200 can be leverage one or more components of the layered architecture of the AI system 500 to perform their respective functions with high computational efficiency. As shown, the AI system 500 can include a set of layers, which conceptually organize elements within an example network topology for the AI system's architecture to implement a particular AI model. Generally, an AI model is a computer-executable program implemented by the AI system 500 that analyses input data to generate inferential output data (e.g., a classification label for input feature vectors). Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 1 and 7. The hardware platform 510 can process amounts of data using one or more servers. The servers can perform backend operations such as matrix calculations, parallel calculations, machine learning training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model. The ML framework 514 can include an open-source library, an application programming interface (API), a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data can be labeled by an external user or operator. For instance, a user may collect a set of training data, such as by capturing data from sensors, images from a camera, outputs from a model, and the like. The training data can include resource data, node data, embedding data, and/or configuration data, such as data elements described in connection with FIGS. 2A-4 or similar data elements. The user or an automatic process may label the training data based on one or more classes and trains the AI model by inputting the training data into the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters comprise dissimilar data. For example, during clustering, data with possible similarities remains in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can be communicatively coupled (e.g., display application data, receive user input, and/or the like) to an interactable user interface of the semantic network platform 200. For example, the application layer 508 can include one or more application that enable resource processing, node generation, node parsing, node indexing, query submission, query result generation, visualization of semantic networks, and the like. The application layer 508 can include desktop applications, mobile applications, web-based applications, agentic applications (e.g., chat bots, AI agents), processing pipelines, and the like. For example, a comprehensive, robust end-to-end pipeline has been developed that can seamlessly iterate through multiple file types with a single modification via a configuration file, allowing for easy switching between different large language models and tailoring the pipeline to suit specific task requirements. This pipeline has been designed with a generic approach, enabling easy integration of various large language model agents, including persona-specific models, depending on the use case.

As used herein, the terms "agent", "local agent", "agent node" and similar terms refer to entities that interact with their environment, process information, and/or take actions to achieve specific goals or objectives, such as the goals or objectives determined based on experimenter questions/queries, and/or inferred from the environment (e.g., by considering the rules, events, attributes, and/or constraints in a virtual world). An agent can be thought of as a combination of software, firmware and/or hardware components that encompass characteristics (e.g., traits, attributes, properties, and/or knowledge), states (e.g., user question or its derivatives, agent feedback), and/or agent interaction rules that govern its behavior and communication with other agents. The agent interaction rules can include references to models (e.g., AI/ML model, such as neural networks) that define agents' decision-making processes and behaviors. Instantiating (spawning) an agent refers to the process of creating a new instance of an agent entity, class or object, which can involve allocating memory for the agent's data structures and variables, initializing agent attributes, setting up agent communication channels, and activating agent reasoning and decision-making mechanisms. This process can be compared to creating a new thread or process in a computer program, where the instantiated agent operates as a separate entity, executing autonomously and interacting with its environment and other agents. Depending on the implementation, agents can take various forms, such as executables running on physical and/or virtual machines and/or robotic agents interacting with physical environments. In some cases, agents can be instantiated as containerized applications, leveraging technologies like Docker, or as serverless functions, utilizing platforms like AWS Lambda. Additionally, agents can be implemented using various programming paradigms, including object-oriented, functional, or logic-based programming, and can be designed to operate in diverse domains, such as e-commerce, healthcare, finance, or transportation.

Agents can use physical or virtualized resources (e.g., processors, memory, cache, communication interfaces, devices, databases, servers, components of the AI/ML stack) in any suitable combination. Particular ones of such resources can be statically allocated or dynamically allocated at runtime (e.g., to a particular agent or group of agents for a duration of a simulation session or a set of simulation sessions). Particular ones of such resources can be dedicated, shared among agents, or shared between an agent and other processes. Various components of agents (e.g., models, data stores, executables) can be implemented across resources in a distributed manner. Accordingly, unless otherwise indicated by context or expressly noted, the terms "local" (as in "local agent") and "node" (as in "agent node") should not be automatically assumed to refer to a particular unitary physical resource.

Example Transformer for Machine Learning Models

To assist in understanding the present disclosure, some concepts relevant to neural networks and machine learning are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation set (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may comprise hundreds of thousands of learned parameters or in the case of a large language model (LLM) may comprise millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for agents and/or chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 6:
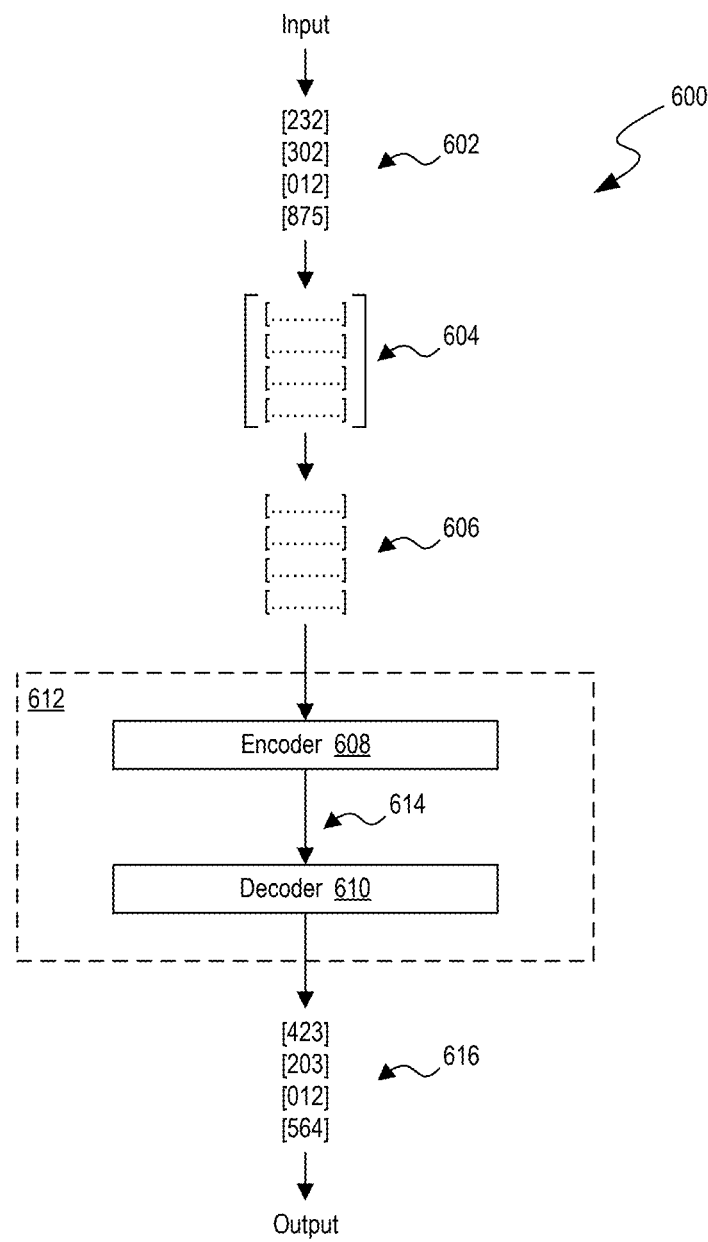
FIG. 6 is a block diagram of an example transformer that can implement aspects of the present technology.

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any ML-based language model, including language models based on other neural network architectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write one summary" can be parsed into the segments [write], [one], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "one," and "summary" each correspond to, respectively, a "write" token, an "one" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 7:
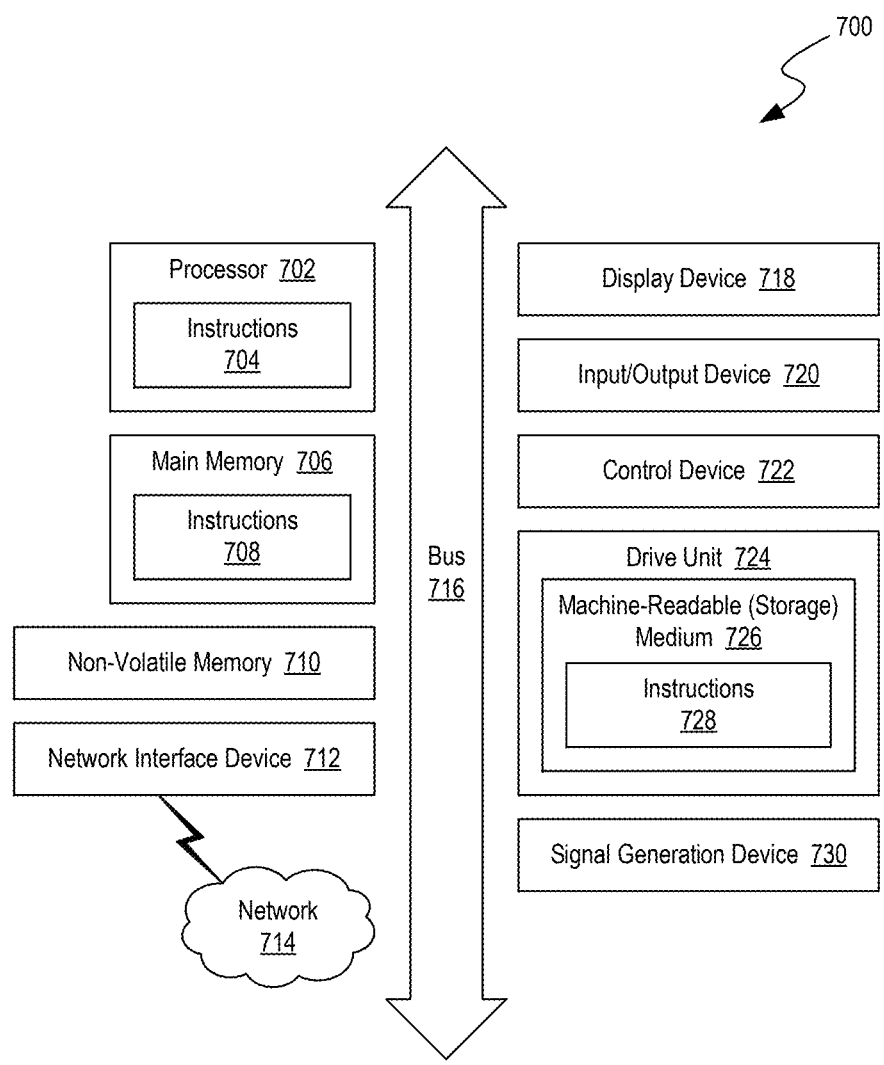
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory computer-readable media having computer-executable instructions stored thereon that, when executed by one or more processors of a semantic network platform, cause the semantic network platform to perform operations comprising:

receiving, by a resource processor of the semantic network platform, a resource comprising a digital document;

segmenting, by the resource processor, the resource into a set of content chunks based on dynamically identified boundaries, wherein the segmenting comprises applying a chunking algorithm, and wherein the chunking algorithm includes one or more of: content-based chunking using resource section headings, content-based chunking using named entity recognition, page-based chunking, or fixed-size chunking;

using the set of content chunks, generating, by the resource processor, a first concept, a second concept, and a relationship, wherein the relationship is between the first concept and the second concept and is determined by performing one or both of: (a) performing proximity analysis on a first token that corresponds to the first concept and a second token that corresponds to the second concept, or (b) analyzing resource metadata;

using the first concept, the second concept, and the relationship, generating, by a node generator, computer-executable code to generate a node triple in a graph structure, the node triple comprising a first node encoding the first concept, a second node encoding the second concept, and a relationship node;

executing, by the semantic network platform, the computer-executable code against the graph structure;

generating, by a node indexer, a first set of embeddings that corresponds to at least a portion of the first node, a second set of embeddings that corresponds to at least a portion of the second node, and a third set of embeddings that corresponds to at least a portion of the relationship node, wherein the first set of embeddings, the second set of embeddings, and the third set of embeddings are indexed relationally to a first node identifier, and wherein the first node identifier correlates to the first concept;

receiving, by an interface module of the semantic network platform, a query that pertains to the resource, wherein at least a portion of the query identifies the first concept, the second concept, or the relationship; and using the at least a portion of the query to query, by the interface module of the semantic network platform, one or more of the first set of embeddings, the second set of embeddings, and the third set of embeddings to identify embeddings associated with the first node identifier that correlates to the at least a portion of the query.

2. The media of claim 1, wherein the resource is a first resource, the operations further comprising:
   extracting the second concept from a second resource by accessing the second resource, by the semantic network platform, via an addressable element associated with the first resource.

3. The media of claim 1,
   wherein the resource is a derivative of computer code; and
   wherein the semantic network platform comprises a preprocessing module that processes the computer code using one or both of static analysis or dynamic analysis to generate a textual or alphanumeric representation of the computer code as the resource.

4. The media of claim 1,
   wherein the resource is a derivative of audio data; and
   wherein the semantic network platform comprises a preprocessing module that generates a textual or alphanumeric representation of the audio data as the resource by performing speech-to-text processing.

5. The media of claim 1,
   wherein the resource is a derivative of a set of images; and
   wherein the semantic network platform comprises a preprocessing module that generates a textual or alphanumeric representation of content in the set of images by performing computer vision-based analysis.

6. The media of claim 1, the operations further comprising:
   receiving an updated version of the resource;
   hashing the set of content chunks of the updated version;
   identifying at least one updated chunk;
   generating an updated set of node triples for the at least one updated chunk;
   updating the graph structure to reflect the updated set of node triples; and
   updating embeddings associated with the at least one updated chunk.

7. The media of claim 6, wherein the first node comprises a node update data structure generated using at least a portion of the updated chunk or a hash of the at least the portion of the updated chunk.

8. A computer-executable method performed by a semantic network platform, the method comprising:
   receiving, by a resource processor of the semantic network platform, a resource comprising a digital document;
   segmenting, by the resource processor, the resource into a set of content chunks based on dynamically identified boundaries;
   using the set of content chunks, generating, by the resource processor, a first concept, a second concept, and a relationship, wherein the relationship is determined by performing one or both of: (a) performing proximity analysis on a first token that corresponds to the first concept and a second token that corresponds to the second concept, or (b) analyzing resource metadata;
   using the first concept, the second concept, and the relationship, generating, by a node generator, computer-executable code to generate a node triple in a graph structure, the node triple comprising a first node encoding the first concept, a second node encoding the second concept, and a relationship node;
   executing, by the semantic network platform, the computer-executable code against the graph structure;
   generating, by a node indexer, a set of embeddings that corresponds to at least a portion of the first node, at least a portion of the second node, and a at least a portion of the relationship node, wherein the set of embeddings is indexed relationally to a first node identifier, and wherein the first node identifier correlates to the first concept;
   receiving, by an interface module of the semantic network platform, a query that pertains to the resource, wherein at least a portion of the query identifies the first concept, the second concept, or the relationship; and
   using the at least a portion of the query to query, by the interface module of the semantic network platform, the set of embeddings to identify embeddings associated with the first node identifier that correlates to the at least a portion of the query.

9. The method of claim 8, wherein the resource is a first resource, the method further comprising:
   extracting the second concept from a second resource by accessing the second resource, by the semantic network platform, via an addressable element associated with the first resource.

10. The method of claim 8,
    wherein the resource is a derivative of computer code; and
    wherein the semantic network platform comprises a preprocessing module that processes the computer code using one or both of static analysis or dynamic analysis to generate a textual or alphanumeric representation of the computer code as the resource.

11. The method of claim 8,
    wherein the resource is a derivative of audio data; and
    wherein the semantic network platform comprises a preprocessing module that generates a textual or alphanumeric representation of the audio data as the resource by performing speech-to-text processing.

12. The method of claim 8,
    wherein the resource is a derivative of a set of images; and
    wherein the semantic network platform comprises a preprocessing module that generates a textual or alphanumeric representation of content in the set of images by performing computer vision-based analysis.

13. The method of claim 8, further comprising:
    receiving an updated version of the resource;
    hashing the set of content chunks of the updated version;
    identifying at least one updated chunk;
    generating an updated set of node triples for the at least one updated chunk;
    updating the graph structure to reflect the updated set of node triples; and
    updating embeddings, in the set of embeddings, associated with the at least one updated chunk.

14. The method of claim 13, wherein the first node comprises a node update data structure generated using at least a portion of the updated chunk or a hash of the at least the portion of the updated chunk.

15. A computing system having at least one processor, at least one memory, and computer-executable instructions stored in the at least one memory that, when executed by the at least one processor, cause the computing system to perform operations comprising:
    receiving, by a resource processor of the computing system, a resource comprising a digital document;
    segmenting, by the resource processor, the resource into a set of content chunks based on dynamically identified boundaries;

using the set of content chunks, generating, by the resource processor, a first concept, a second concept, and a relationship, wherein the relationship is determined by performing one or both of: (a) performing proximity analysis on a first token that corresponds to the first concept and a second token that corresponds to the second concept, or (b) analyzing resource metadata;

using the first concept, the second concept, and the relationship, generating, by a node generator, computer-executable code to generate a node triple in a graph structure, the node triple comprising a first node encoding the first concept, a second node encoding the second concept, and a relationship node;

executing, by the computing system, the computer-executable code against the graph structure;

generating, by a node indexer, a set of embeddings that corresponds to at least a portion of the first node, at least a portion of the second node, and a at least a portion of the relationship node, wherein the set of embeddings is indexed relationally to a first node identifier, and wherein the first node identifier correlates to the first concept;

receiving, by an interface module of the computing system, a query that pertains to the resource, wherein at least a portion of the query identifies the first concept, the second concept, or the relationship; and using the at least a portion of the query to query, by the interface module of the computing system, the set of embeddings to identify embeddings associated with the first node identifier that correlates to the at least a portion of the query.

16. The computing system of claim 15, wherein the resource is a first resource, the operations further comprising:

extracting the second concept from a second resource by accessing the second resource, by the computing system, via an addressable element associated with the first resource.

17. The computing system of claim 15,
wherein the resource is a derivative of computer code; and
wherein the computing system comprises a pre-processing module that processes the computer code using one or both of static analysis or dynamic analysis to generate a textual or alphanumeric representation of the computer code as the resource.

18. The computing system of claim 15,
wherein the resource is a derivative of audio data; and
wherein the computing system comprises a pre-processing module that generates a textual or alphanumeric representation of the audio data as the resource by performing speech-to-text processing.

19. The computing system of claim 15,
wherein the resource is a derivative of a set of images; and
wherein the computing system comprises a pre-processing module that generates a textual or alphanumeric representation of content in the set of images by performing computer vision-based analysis.

20. The computing system of claim 19, the operations further comprising:
receiving an updated version of the resource;
hashing the set of content chunks of the updated version;
identifying at least one updated chunk;
generating an updated set of node triples for the at least one updated chunk;
updating the graph structure to reflect the updated set of node triples; and
updating embeddings, in the set of embeddings, associated with the at least one updated chunk.

\* \* \* \* \*